(12) United States Patent
Zhao et al.

(10) Patent No.: US 11,811,920 B1
(45) Date of Patent: Nov. 7, 2023

(54) SECURE COMPUTATION AND COMMUNICATION

(71) Applicant: Lemon Inc., Grand Cayman (KY)

(72) Inventors: Yongjun Zhao, Beijing (CN); Jian Du, Culver City, CA (US); Haohao Qian, Beijing (CN); Bo Jiang, Culver City, CA (US); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/297,424

(22) Filed: Apr. 7, 2023

(51) Int. Cl.
 *H04L 29/06* (2006.01)
 *H04L 9/08* (2006.01)
 *G09C 1/00* (2006.01)

(52) U.S. Cl.
 CPC ............... *H04L 9/085* (2013.01); *G09C 1/00* (2013.01)

(58) Field of Classification Search
 None
 See application file for complete search history.

(56) References Cited

U.S. PATENT DOCUMENTS

| | | | |
|---|---|---|---|
| 7,058,603 B1 * | 6/2006 | Rhiando | G07C 15/005 705/50 |
| 9,652,622 B2 * | 5/2017 | Garfinkle | G06F 17/16 |
| 10,289,816 B1 | 5/2019 | Malassenet | |
| 11,522,688 B2 * | 12/2022 | Goodsitt | G11B 5/00813 |
| 11,593,510 B1 | 2/2023 | Knox et al. | |
| 11,704,431 B2 | 7/2023 | Kraus et al. | |
| 2004/0179686 A1 | 9/2004 | Matsumura et al. | |
| 2010/0131764 A1 | 5/2010 | Goh | |
| 2011/0202764 A1 * | 8/2011 | Furukawa | H04L 9/0844 713/167 |
| 2012/0143922 A1 | 6/2012 | Rane et al. | |
| 2013/0212690 A1 | 8/2013 | Fawaz et al. | |

(Continued)

FOREIGN PATENT DOCUMENTS

CN 116049626 A 5/2023

OTHER PUBLICATIONS

Buddhavarapu et al., "Private matching for compute", Cryptology ePrint Archive, 2020, https://eprint.iacr.org/2020/599.

(Continued)

*Primary Examiner* — Maung T Lwin
(74) *Attorney, Agent, or Firm* — HAMRE, SCHUMANN, MUELLER & LARSON, P.C.

(57) ABSTRACT

Methods and systems for secure computation and communication are described herein. The method includes transforming identifications of a first dataset using a transforming scheme, dispatching the transformed identifications of the first dataset, receiving identifications of a second dataset, transforming the identifications of the second dataset, dispatching the transformed identifications of the second dataset, receiving a set of identifications, generating a first intersection of the received set of identifications and the transformed identifications of second dataset, and determining a first permutation based on the first intersection. The method also includes performing an oblivious shuffling based on the first permutation and a set of attributions to generate a first share. A size of the first share is the same as a size of the first intersection. The method further includes receiving a second share and constructing a first result based on the first share and the second share.

20 Claims, 7 Drawing Sheets

(56) References Cited

U.S. PATENT DOCUMENTS

| | | | |
|---|---|---|---|
| 2016/0150047 | A1 | 5/2016 | O'Hare et al. |
| 2018/0101697 | A1 | 4/2018 | Rane et al. |
| 2019/0065775 | A1 | 2/2019 | Klucar, Jr. et al. |
| 2019/0244138 | A1 | 8/2019 | Bhowmick et al. |
| 2019/0361794 | A1 | 11/2019 | Maksyutov et al. |
| 2020/0250335 | A1 | 8/2020 | Hockenbrocht et al. |
| 2020/0401726 | A1* | 12/2020 | Lim ................ H04L 9/0643 |
| 2021/0073677 | A1 | 3/2021 | Peterson et al. |
| 2021/0173856 | A1 | 6/2021 | Chitnis et al. |
| 2021/0336771 | A1 | 10/2021 | Mukherjee |
| 2021/0360010 | A1 | 11/2021 | Zaccak et al. |
| 2021/0399874 | A1 | 12/2021 | Polyakov et al. |
| 2022/0100899 | A1 | 3/2022 | Saillet et al. |
| 2022/0138348 | A1 | 5/2022 | Bernau et al. |
| 2022/0244988 | A1 | 8/2022 | Zhang et al. |
| 2022/0277097 | A1 | 9/2022 | Cabot et al. |
| 2022/0335450 | A1 | 10/2022 | Fenton et al. |
| 2022/0405800 | A1 | 12/2022 | Walcott et al. |
| 2023/0017374 | A1 | 1/2023 | Boehler |
| 2023/0045553 | A1 | 2/2023 | Deshpande |
| 2023/0125887 | A1 | 4/2023 | Habite et al. |
| 2023/0146259 | A1 | 5/2023 | Liktor et al. |
| 2023/0214684 | A1 | 7/2023 | Wang et al. |

OTHER PUBLICATIONS

Guo et al., "Birds of a Feather Flock Together: How Set Bias Helps to Deanonymize You via Revealed Intersection Sizes", 31st USENIX Security Symposium, Aug. 10-12, 2022, Boston, MA, USA, https://www.usenix.org/conference/usenixsecurity22/presentation/guo.

Ion et al., "On Deploying Secure Computing: Private Intersection-Sum-with-Cardinality", 2020 IEEE European Symposium on Security and Privacy (EuroS&P), Date of Conference: Sep. 7-11, 2020, Date added to IEEE Xplore: Nov. 2, 2020, https://www.researchgate.net/publication/346584438_On_Deploying_Secure_Computing_Private_Intersection-Sum-with-Cardinality.

Chandran et al., "Circuit-PSI with Linear Complexity via Relaxed Batch OPPRF", Cryptology ePrint Archive, https://eprint.iacr.org/2021/034.

Pinkas et al., "SpOT-Light: Lightweight Private Set Intersection from Sparse OT Extension", Cryptology ePrint Archive, https://eprint.iacr.org/2019/634.

Chase et al., "Secret Shared Shuffle", Cryptology ePrint Archive, https://eprint.iacr.org/2019/1340.

Mohassel et al., "How to Hide Circuits in MPC: An Efficient Framework for Private Function Evaluation", Cryptology ePrint Archive, https://eprint.iacr.org/2013/137.

Garimella et al., "Private Set Operations from Oblivious Switching", Cryptology ePrint Archive, https://eprint.iacr.org/2021/243.

Dwork et al., "Differential Privacy and Robust Statistics", Association for Computing Machinery, May 31, 2009, pp. 371-380, https://dl.acm.org/doi/10.1145/1536414.1536466.

Dwork et al., "Differential Privacy Under Continual Observation", Association for Computing Machinery, Jun. 5, 2010, pp. 715-724, https://dl.acm.org/doi/10.1145/1806689.1806787.

Dwork et al. "Our Data, Ourselves: Privacy via Distributed Noise Generation", Advances in Cryptology—EUROCRYPT 2006: 24th Annual International Conference on the Theory and Applications of Cryptographic Techniques, St. Petersburg, Russia, May 28-Jun. 1, 2006. Proceedings 25. Springer Berlin Heidelberg, 2006, https://doi.org/10.1007/11761679_29.

Office Action dated Jul. 12, 2023 issued in U.S. Appl. No. 18/297,447.

Notice of Allowance dated Jul. 25, 2023 issued in U.S. Appl. No. 18/297,530.

Notice of Allowance dated Aug. 2, 2023 issued in U.S. Appl. No. 18/297,545.

Office Action dated Aug. 3, 2023 issued in U.S. Appl. No. 18/297,339.

Office Action dated Jun. 12, 2023 issued in U.S. Appl. No. 18/297,376.

Office Action dated Jul. 11, 2023 issued in U.S. Appl. No. 18/297,389.

Office Action dated Jun. 14, 2023 issued in U.S. Appl. No. 18/297,405.

Notice of Allowance dated Aug. 30, 2023 issued in U.S. Appl. No. 18/297,376.

Notice of Allowance dated Aug. 30. 2023 issued in U.S. Appl. No. 18/297,405.

Notice of Allowance dated Aug. 19, 2023 issue in U.S. Appl. No. 18/297,389.

Du et al., DP-PSI: Private and secure set intersection, Aug. 28, 2022, Cornel University, https://doi.org/10.48550/ arXiv.2208.13249V1, p. 1-9. (Year: 2022).

Case, Benjamin et al. "The Privacy-preserving Padding Problem: Non-negative Mechanisms for Conservative Answers with Differential Privacy." 20 Pages. Oct. 15, 2021. https://arxiv.org/abs/2110.08177.

Kairouz, Peter, Sewoong Oh, and Pramod Viswanath. "The composition theorem for differential privacy." International conference on machine learning. PMLR, 2015. (Year: 2015).

* cited by examiner

SECURE COMPUTATION AND COMMUNICATION

FIELD

The embodiments described herein pertain generally to private and secure computation and communication. More specifically, the embodiments described herein pertain to private inner join and secure computation and communication of data from multiple data owners.

BACKGROUND

Inner join of records of datasets from multiple data owners may be a prerequisite for subsequent operations for many applications, including the collection of the aggregate statistics, the training of distributed machine learning models, etc. For instance, when one party owns elements' feature data or attribution data and another party owns the elements' label or identification, there is a need for a private inner join that does not reveal the intersection before conducting the distributed or federated training in machine learning applications.

Existing private-matching-for-computing schemes may complete private identity matching without revealing the intersection of datasets or database of two parties, and generate secure sharing of the two-party data after the member or user identifications in the datasets being matched for subsequent multi-party computation.

SUMMARY

It is to be understood that the communication complexity and the computational complexity of an existing scheme can be relatively high, and an optimized scheme needs to be designed for privacy matching and computation for the amount of big data. Features in the embodiments disclosed herein may help solve a problem of privacy matching of two-party or multi-party data in a two-party or multi-party secure computation, and generating the secure sharing of data associated with the intersection of datasets from the two or more parties. Features in the embodiments disclosed herein may provide a private and secure protocol based on various algorithms such as a computational complexity assumption (e.g., the decisional Diffie-Hellman assumption, etc.), an oblivious shuffling algorithm, etc., and may effectively reduce the communication complexity and the computational complexity compared with the existing scheme.

It is to be understood that in a semi-honest security model, all the parties may follow the private join operation and the computing protocol honestly while trying to extract more information from or regarding the other party's input dataset. Features in the embodiments disclosed herein may provide security with regard to a semi-honest and computationally bounded adversary.

In one example embodiment, a method for secure computation and communication is provided. The method includes transforming identifications of a first dataset using a transforming scheme, dispatching the transformed identifications of the first dataset, receiving identifications of a second dataset, transforming the identifications of the second dataset, dispatching the transformed identifications of the second dataset, receiving a set of identifications, generating a first intersection of the received set of identifications and the transformed identifications of second dataset, and determining a first permutation based on the first intersection. The method also includes performing an oblivious shuffling based on the first permutation and a set of attributions to generate a first share. A size of the first share is the same as a size of the first intersection. The method further includes receiving a second share and constructing a first result based on the first share and the second share.

In another example embodiment, a method for secure computation and communication is provided. The method includes transforming identifications of a first dataset using a transforming scheme, dispatching the transformed identifications of the first dataset, receiving identifications of a second dataset, transforming the identifications of the second dataset, dispatching the transformed identifications of the second dataset, receiving a set of identifications, and generating a first intersection of the received set of identifications and the transformed identifications of second dataset. The method also includes performing an oblivious shuffling based on a first permutation and attributions of the first dataset to generate a first share. A size of the first share is the same as a size of the first intersection. The method further includes receiving a second share and constructing a first result based on the first share and the second share.

In yet another example embodiment, a non-transitory computer-readable medium having computer-executable instructions stored thereon is provided. The instructions, upon execution, cause one or more processors to perform operations including transforming identifications of a first dataset using a transforming scheme; dispatching the transformed identifications of the first dataset; receiving identifications of a second dataset; transforming the identifications of the second dataset; dispatching the transformed identifications of the second dataset; receiving a set of identifications; generating a first intersection of the received set of identifications and the transformed identifications of second dataset; determining a first permutation based on the first intersection; performing an oblivious shuffling based on the first permutation and a set of attributions to generate a first share, a size of the first share being the same as a size of the first intersection; receiving a second share; and constructing a first result based on the first share and the second share.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
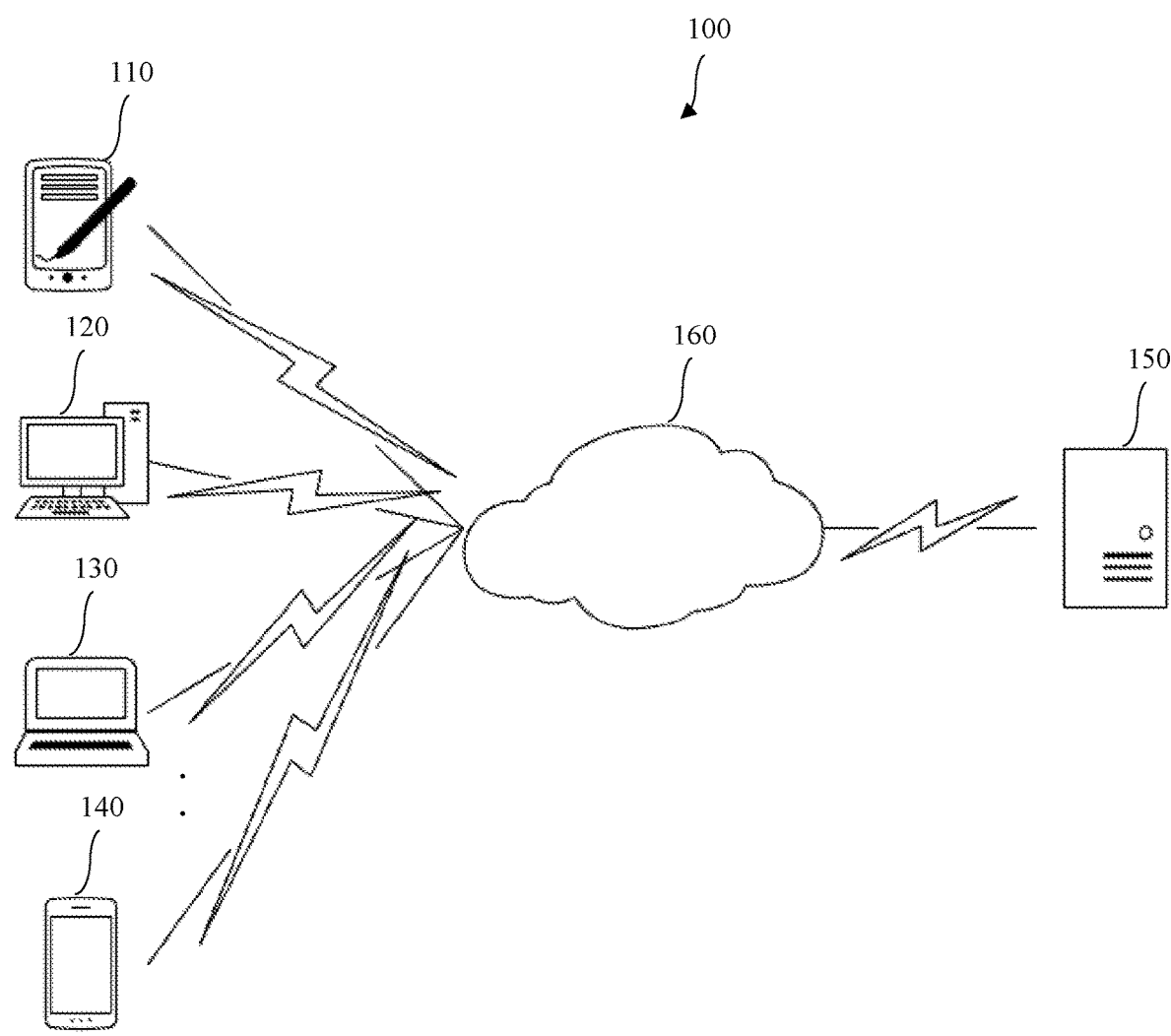
FIG. 1 is a schematic view of an example secure computation and communication system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, user's unique ID, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "hashing" may refer to an operation or function that transforms or converts an input (a key such as a numerical value, a string of characters, etc.) into an output (e.g., another numerical value, another string of characters, etc.). It is to be understood that hashing is a term of art and may be used in cyber security application(s) to access data in a small and nearly constant time per retrieval.

As referenced herein, "federated", "distributed", or "collaborative" learning or training is a term of art and may refer to a machine learning techniques that train an algorithm across multiple decentralized edge devices or servers that store local data samples, without exchanging the data samples among the devices or servers. It is to be understood that "federated" learning or training may stand in contrast to traditional centralized machine learning techniques by which all the local datasets are uploaded to one server, as well as to more classical decentralized approaches which often assume that local data samples are identically distributed. Federated learning or training may enable multiple actors to build a common, robust machine learning model without sharing data among the actors, thus addressing critical issues such as data privacy, data security, data access rights and access to heterogeneous data.

As referenced herein, "MPC" or "multi-party computation" is a term of art and may refer to a field of cryptography with the goal of creating schemes for parties to jointly compute a function over the joint input of the parties while keeping respective input private. It is to be understood that, unlike traditional cryptographic tasks where cryptography may assure security and integrity of communication or storage when an adversary is outside the system of participants (e.g., an eavesdropper on the sender and/or the receiver), the cryptography in MPC may protect participants' privacy relative to each other.

As referenced herein, "ECC" or "elliptic-curve cryptography" is a term of art and may refer to a public-key cryptography based on the algebraic structure of elliptic curves over finite fields. It is to be understood that the ECC may allow smaller keys compared to non-EC cryptography to provide equivalent security. It is also to be understood that "EC" or "elliptic curve" may be applicable for key agreement, digital signatures, pseudo-random generators, and/or other tasks. Elliptic curves may be indirectly used for encryption by combining a key agreement between/among the parties with a symmetric encryption scheme. Elliptic curves may also be used in integer factorization algorithms based on elliptic curves that have applications in cryptography.

As referenced herein, "decisional Diffie-Hellman assumption" or "DDH assumption" is a term of art and may refer to a computational complexity assumption about a certain problem involving discrete logarithms in cyclic groups. It is to be understood that the DDH assumption may be used as a basis to prove the security of many cryptographic protocols.

As referenced herein, "elliptic-curve Diffie-Hellman" or "ECDH" is a term of art and may refer to a key agreement protocol or a corresponding algorithm that allows two or more parties, each having an elliptic-curve public-private key pair, to establish a shared secret over an unsecured channel. It is to be understood that the shared secret may be directly used as a key or to derive another key. It is also to be understood that the key, or the derived key, may then be used to encrypt or encode subsequent communications using a symmetric-key cipher. It is further to be understood that ECDH may refer to a variant of the Diffie-Hellman protocol using elliptic-curve cryptography.

As referenced herein, "homomorphic" encryption is a term of art and may refer to a form of encryption that permits users to perform computations on encrypted data without first decrypting it. It is to be understood that the resulting computations of homomorphic encryption are left in an encrypted form which, when decrypted, result in an identical output to that produced had the operations been performed on the unencrypted data. It is also to be understood that the homomorphic encryption can be used for privacy-preserving outsourced storage and computation, which may allow data to be encrypted and out-sourced to commercial cloud environments for processing, all while encrypted. It is further to be understood that an additively homomorphic encryption or cryptosystem may refer to a form of encryption or cryptosystem that, given only the public key and the encryption of message m1 and message m2, one can compute the encryption of m1+m2.

As referenced herein, "secret sharing" or "secret splitting" is a term of art and may refer to cryptographic actions or algorithms for generating a secret, breaking the secret into multiple shares, and distributing the shares among multiple parties, so that only when the parties bring together their respective shares can the secret be reconstructed. It is to be understood that secret sharing may refer to actions or algorithms for distributing a secret among a group, in such a way that no individual holds any intelligible information about the secret, but when a sufficient number of individuals combine their "shares", the secret may be reconstructed. It is also to be understood that whereas insecure secret sharing may allow an attacker to gain more information with each share, secure secret sharing may be "all or nothing", where "all" may mean the necessary number of shares.

As referenced herein, "shuffle", "shuffling", "permute", or "permuting" is a term of art and may refer to an action or algorithm for rearranging and/or randomly rearranging the order of the records (elements, rows, etc.) of e.g., an array, a dataset, a database, a data table, etc.

As referenced herein, a "permutation" is a term of art and may refer to any one of several possible order or arrangement variations for a dataset (e.g., records or elements of the dataset, etc.) or a portion thereof. In an embodiment, a permutation of a dataset may refer to an arrangement at least a portion of the records (e.g., rows, etc.) or elements of the dataset into a sequence or linear order; or a rearrangement of at least a portion of the records or elements of the dataset.

As referenced herein, "oblivious shuffling" is a term of art and may refer to implementation or execution of a "shuffling" algorithm or operation to rearrange an order of at least a portion of records (e.g., rows, etc.) or elements of e.g., a dataset such that the processor (e.g., of a device or a server that runs the algorithm) is precluded from linking together the position of a record or element pre-shuffling with the position of the same record or element post-shuffling. It is to be understood that "oblivious shuffling" may be used to remove any links that the processor might have created with regard to records in the position before the oblivious shuffling.

In an example embodiment, an "oblivious shuffling" algorithm or operation may (1) receive a "permutation" as an input (e.g., from Party A) and receive a dataset (or a portion thereof) as another input (e.g., from Party B), and (2) shuffle or permute the input dataset (or a portion thereof) based on the arrangement defined in the input "permutation", but does not leak any information about either the "permutation" or the real contents of the dataset (or a portion thereof) e.g., to the other party.

For the party (e.g., Party A) that provides the input "permutation", an "oblivious shuffling" algorithm may generate a secret share (e.g., a first secret share) as an output to that party (e.g., Party A). For the party (e.g., Party B) that provides the input dataset (or a portion thereof), the "oblivious shuffling" algorithm may generate another secret share (e.g., a second secret share) as an output to that party (e.g., Party B). In an example embodiment, the first secret share and the second secret share may be additive shares. That is, a result showing the real data may be generated by adding together the first secret share and the second secret share. Thus, an additively homomorphic encryption algorithm or the like may be used to generate the first secret share and/or the second secret share. As stated previously, an additively homomorphic encryption or cryptosystem may refer to a form of encryption or crypto system that, given only the public key and the encryption of message m1 and message m2, one can compute the encryption of m1+m2. Still, it is to be understood that the first secret share and the second secret share may be generated using any suitable secret sharing algorithms.

In an example embodiment, "oblivious shuffling" may refer to a shuffling algorithm using homomorphic encryption, a garbled circuit, and/or an oblivious switching network to implement the shuffling. For example, an "oblivious shuffling" algorithm may be a secret-shared shuffle algorithm, an oblivious switching network algorithm, or any other suitable oblivious shuffling algorithm. It is to be understood that garbled circuit may refer to a cryptographic algorithm or protocol that may enable two-party secure computation in which two mistrusting parties can jointly evaluate a function based on their private inputs without the presence of a trusted third party. For the garbled circuit and/or oblivious switching network algorithm or protocol, an oblivious transfer algorithm or protocol may be used. It is also to be understood that for cryptography, an oblivious transfer algorithm or protocol may refer to an algorithm or protocol in which a sender transfers at least one of potentially many pieces of information to a receiver, but remains unaware of, unmindful of, or otherwise ignorant of what piece or pieces (if any) of information has been transferred.

As referenced herein, a "semi-honest" adversary is a term of art and may refer to a party who may try to corrupt one or more other parties while still following a protocol as specified. It is to be understood that the "semi-honest" party may be a corrupt party that runs a present protocol honestly but may try to intercept and/or decipher messages received by another party and/or parties for purposes beyond those intended by the protocol.

FIG. 1 is a schematic view of an example secure computation and communication system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user, e.g., Party A or Party B, may use one or more of the terminal devices 110, 120, 130, and 140 to interact with the server 150 via the network 160. Various applications or localized interfaces thereof, such as social media applications, online shopping services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
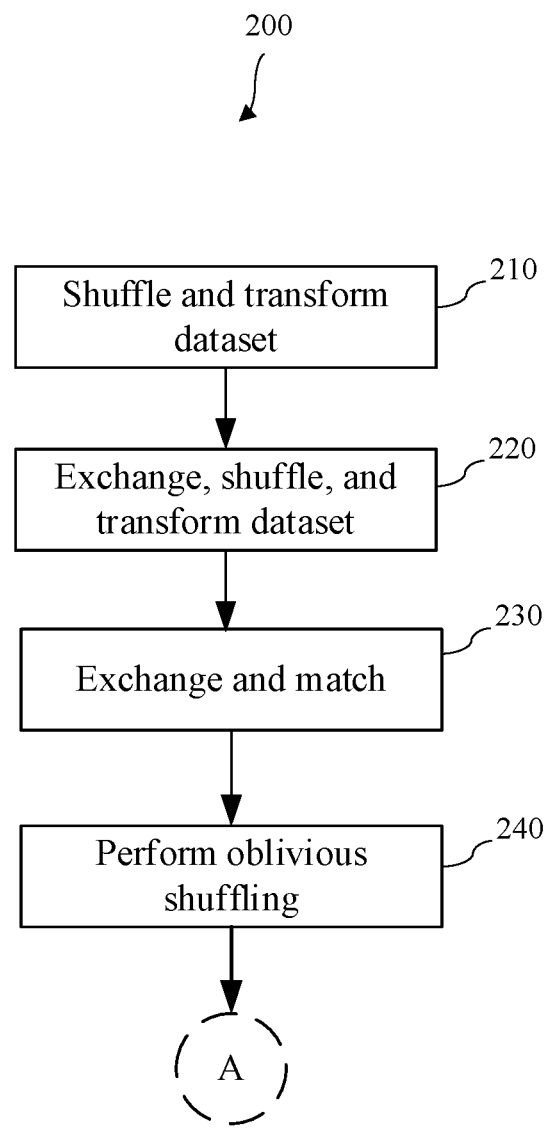
FIG. 2 is a flow chart illustrating an example inner join processing flow for private and secure computations and communication, in accordance with at least some embodiments described herein.
Figure 4A:
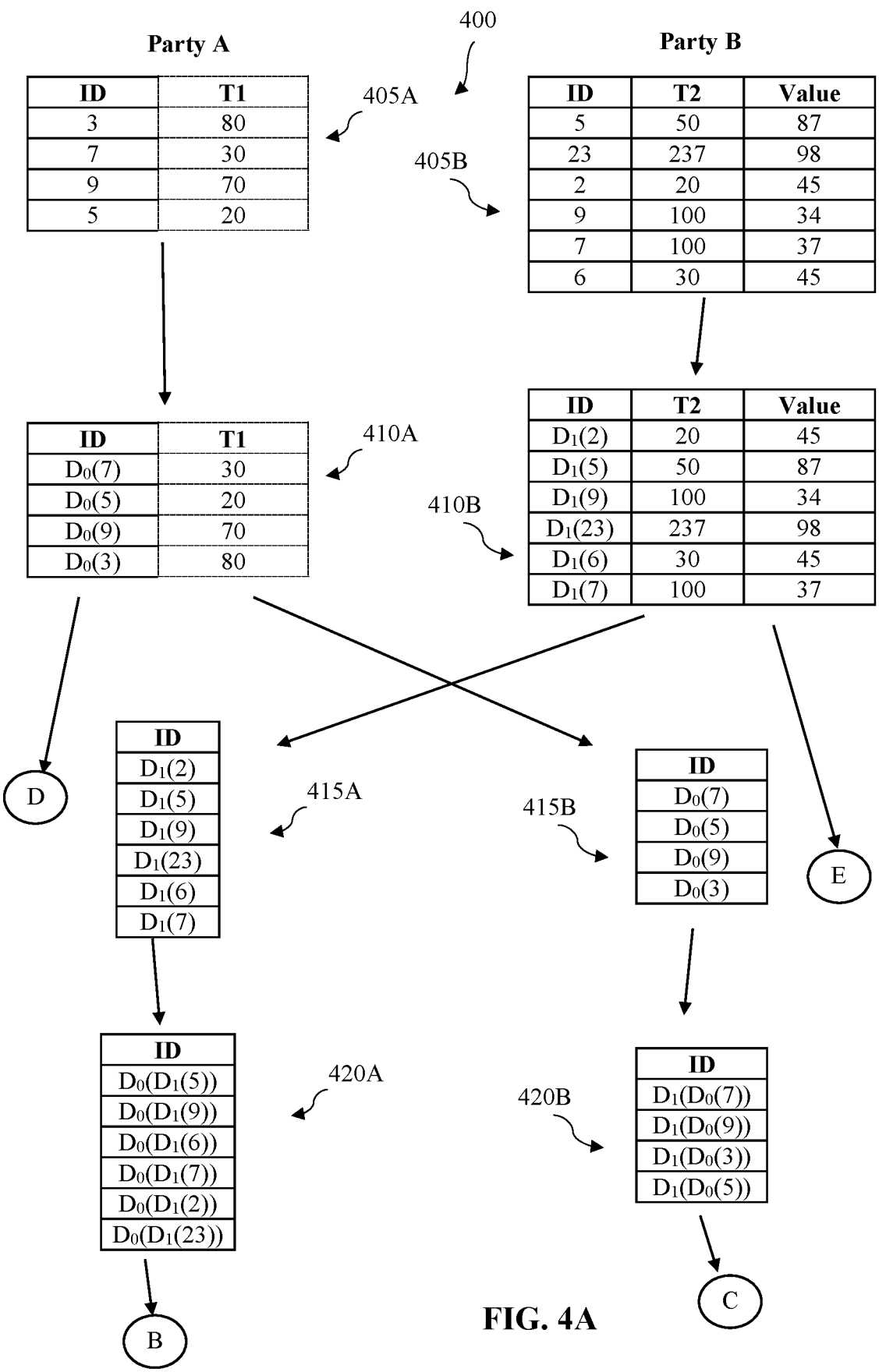
FIG. 4A shows a first portion of a schematic diagram illustrating an example of the processing flow of FIG. 2, in accordance with at least some embodiments described herein.
Figure 4B:
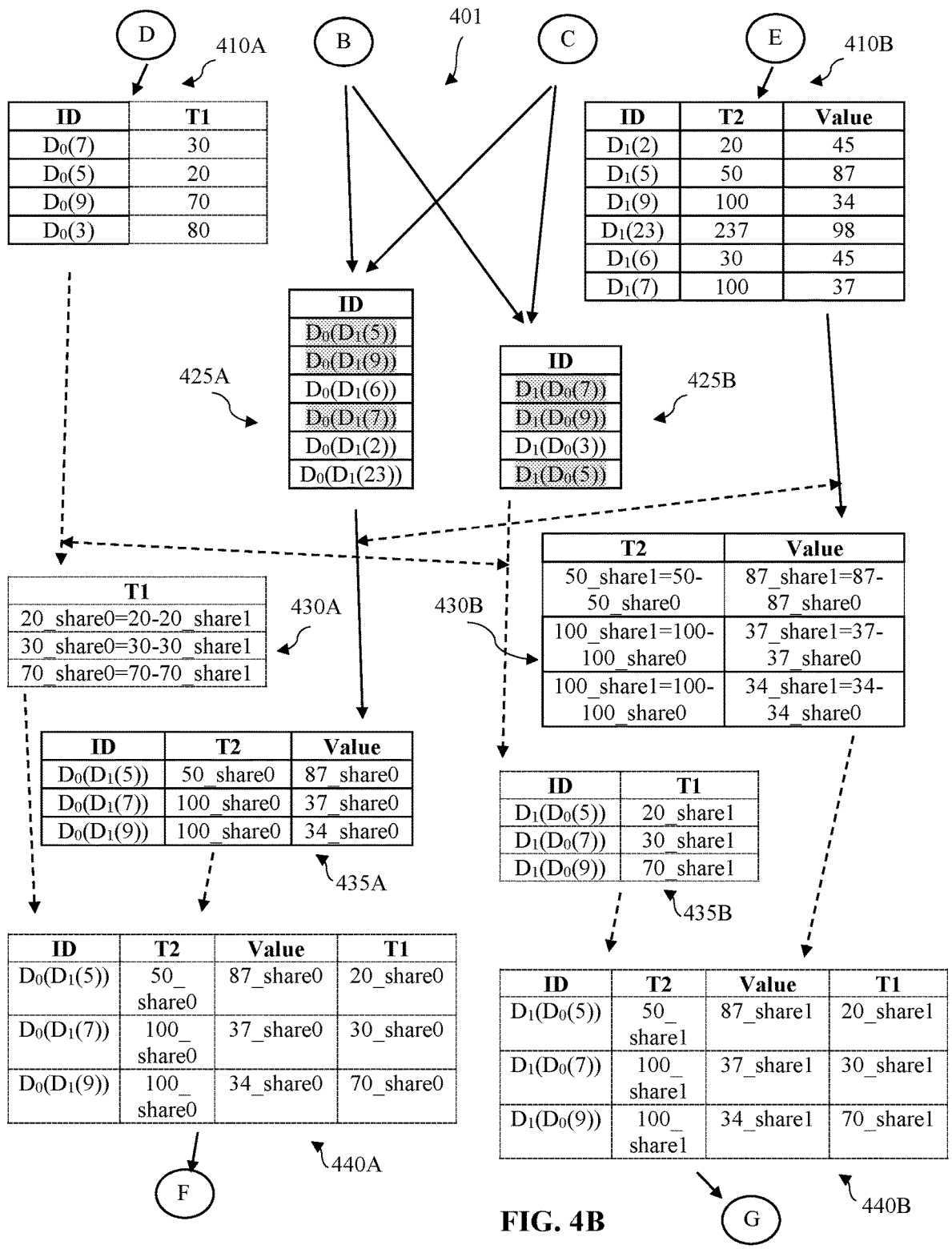
FIG. 4B shows a second portion of a schematic diagram illustrating an example of the processing flow of FIG. 2, in accordance with at least some embodiments described herein.

FIG. 2 is a flow chart illustrating an example inner join processing flow 200 for private and secure computations and communication, in accordance with at least some embodiments described herein. FIG. 4A shows a first portion 400 of a schematic diagram illustrating an example of the processing flow 200 of FIG. 2, in accordance with at least some embodiments described herein. FIG. 4B shows a second portion 401 of a schematic diagram illustrating an example of the processing flow 200 of FIG. 2, in accordance with at least some embodiments described herein.

Figure 5:
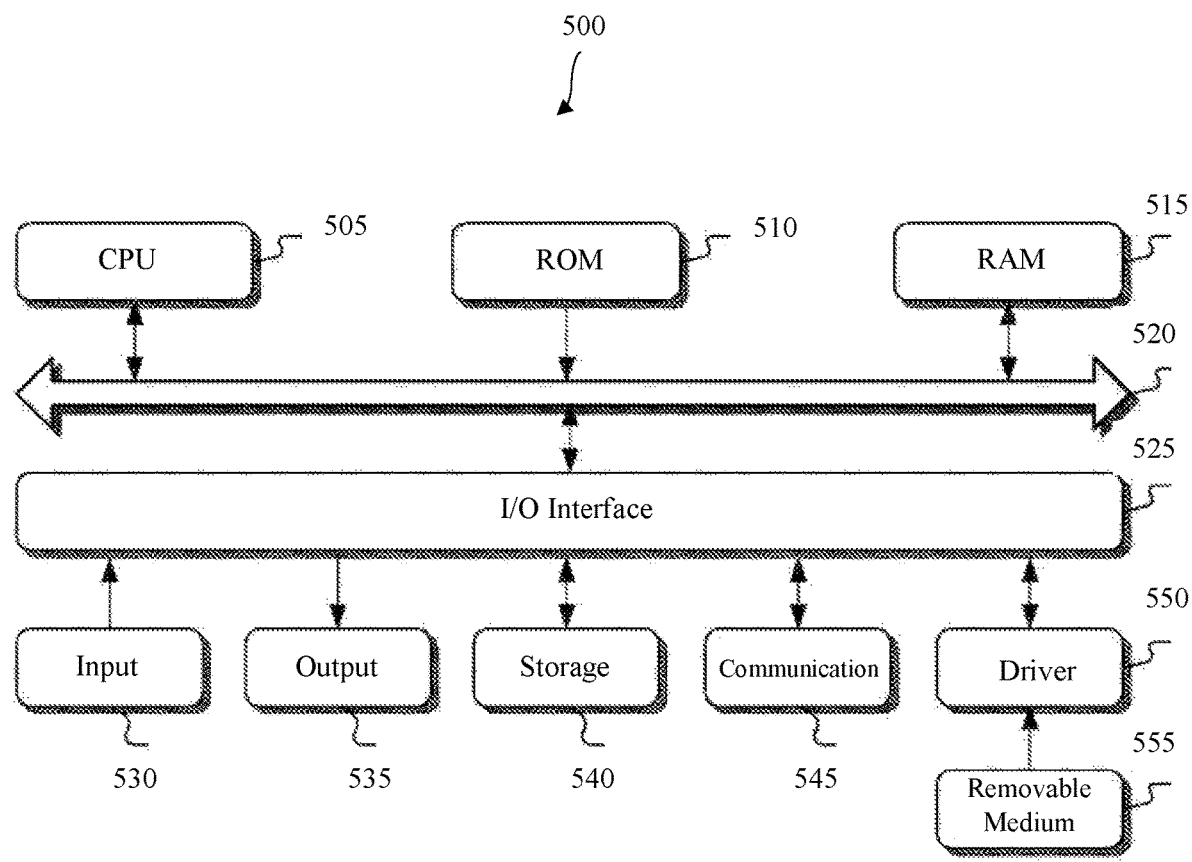
FIG. 5 is a schematic structural diagram of an example computer system applicable to implementing an electronic device, arranged in accordance with at least some embodiments described herein.

It is to be understood that the processing flow 200 disclosed herein can be conducted by one or more processors (e.g., the processor of one or more of the terminal device 110, 120, 130, and 140 of FIG. 1, the processor of the server 150 of FIG. 1, the central processor unit 505 of FIG. 5, and/or any other suitable processor), unless otherwise specified.

It is also to be understood that the processing flow 200 can include one or more operations, actions, or functions as illustrated by one or more of blocks 210, 220, 230, and 240. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 200, operations including initializations or the like may be performed. For example, system parameters and/or application parameters may be initialized. Processing flow 200 may begin at block 210.

At block 210 (Shuffle and transform dataset), the processor may provide a dataset (e.g., 405A of FIG. 4A) for Party A, and/or provide a dataset (e.g., 405B of FIG. 4A) for Party B. In an example embodiment, the size of the dataset 405A or 405B may include tens or hundreds of thousands of elements (or records, rows, etc.). It is to be understood that a size of a dataset may refer to the number of elements (or records, rows, etc.) of the dataset. It is to be understood that the size of the dataset 405A may be significantly larger than the size of the dataset 405B or vice versa.

In an example embodiment, the dataset 405A includes multiple records (rows), each record including a member name or user identification (ID) and a time (T1) indicating e.g., the time (e.g., the starting time or timestamp) when the user (having the user ID) clicks on e.g., a link or the like on Party A's platform.

The dataset 405B includes multiple records (rows), each record including a member name or user identification (ID), a time (T2) indicating e.g., the time (e.g., the starting time or timestamp) when the user (having the user ID) goes to Party B's website, and a value (Value) indicating the value of the user for Party B. In an example embodiment, the time (or timestamp) is listed in units of "minutes".

It is to be understood that the format, content, and/or arrangement of the dataset 405A and/or 405B described and illustrated herein are for descriptive purposes only and are not intended to be limiting. For example, each dataset 405A or 405B may have one or more IDs (columns) and/or one or more features or attributes (columns) associated with the ID or IDs. In another example embodiment, the dataset 405A or 405B may have one or more IDs (columns) without any features or attributes (columns) associated with the ID or IDs.

In an example embodiment, Party A and/or Party B may want to learn e.g., (1) how many users have clicked on e.g., a link or the like on Party A's platform (e.g., by activating a link, opening a website, etc.) and went to Party B's website and made valuable interaction within a predetermined time frame, (2) how many users clicked on e.g., a link or the like on Party A's platform and went to Party B's website within a certain period of time (e.g., within 70 minutes) after the user clicked on e.g., a link or the like on Party A's platform, and made a valuable interaction, and/or (3) the total value of all users who have clicked on e.g., a link or the like on Party A's platform and went to Party B's website within a certain period of time (e.g., within 70 minutes) after the users clicked on e.g., a link or the like on Party A's platform.

It is to be understood that Party A and/or Party B may not want to reveal to the other party the data in the dataset 405A and/or the dataset 405B, and/or in the intersection of the dataset 405A and the dataset 405B.

At block 210, the processor of the respective device may also shuffle (e.g., randomly permute, etc.) the dataset 405A to obtain or generate the dataset 410A for Party A, and/or shuffle the dataset 405B to obtain or generate the dataset 410B for Party B.

The processor may also transform the ID (column) of the dataset 410A using the transforming scheme for Party A.

It is to be understood that the function or operation to "transform" or of "transforming" a dataset or a portion thereof, e.g., one or more columns (or rows) of a dataset such as one or more identification fields/columns (or records/rows), etc., may refer to processing (e.g., encrypting, decrypting, encoding, decoding, manipulating, compressing, decompressing, converting, etc.) the dataset or a portion thereof from one form to another form. It is also to be understood that the "transforming scheme" may refer to an algorithm, protocol, or function of performing the processing (e.g., encrypting, decrypting, encoding, decoding, manipulating, compressing, decompressing, converting, etc.) of the dataset or a portion thereof from one form to another form. In an example embodiment, the processor may encrypt (or decrypt, encode, decode, manipulate, compress, decompress, convert, etc.) the ID of the dataset 410A to an encrypted (or decrypted, encoded, decoded, manipulated, compressed, decompressed, converted, etc.) form using e.g., a key of Party A based on an ECDH algorithm or protocol (represented by the function $D_0(.)$).

The processor may also transform the ID of the dataset 410B using a transforming scheme for Party B. In an example embodiment, the processor may encrypt (or decrypt, encode, decode, manipulate, compress, decompress, convert, etc.) the ID of the dataset 410B to an encrypted (or decrypted, encoded, decoded, manipulated, compressed, decompressed, converted, etc.) form using e.g., a key of Party B based on the ECDH algorithm or protocol (represented by the function $D_1(.)$). In an example embodiment, the T1 (column) of the dataset 410A and/or the T2 (column) and Value (column) of the dataset 410B may not be transformed.

It is to be understood that at block 210, for Party A and/or Party B, a sequence of the transforming of the dataset and the shuffling of the dataset may be switched or changed, without impacting the purpose of the resultant dataset. For example, the processor may transform the dataset 405A to obtain or generate the dataset 410A for Party A, and then shuffle the dataset 410A. The processor may also transform the dataset 405B to obtain or generate the dataset 410B for Party B, and then shuffle the dataset 410B. Processing may proceed from block 210 to block 220.

At block 220 (Exchange, shuffle, and transform dataset), the processor of the respective devices may exchange the ID field(s) of the dataset 410A with the ID field(s) of the dataset 410B between Party A and Party B. For Party A, the processor may dispatch or send the ID field(s) of the dataset 410A to Party B, and receive or obtain the ID field(s) of the dataset 410B from Party B as dataset 415A (See FIG. 4A). For Party B, the processor may dispatch or send the ID field(s) of the dataset 410B to Party A, and receive or obtain the ID field(s) of the dataset 410A from Party A as dataset 415B (See FIG. 4A). It is to be understood that since the ID field(s) of the dataset 410A and the ID field(s) of the dataset 410B have been transformed (e.g., encoded, etc.), the corresponding receiving party may not know the real data/IDs in the received dataset, which only includes the ID field(s) without any feature or attribute fields.

The processor may also shuffle the dataset 415A for Party A to obtain or generate the dataset 420A, and/or shuffle the dataset 415B for Party B o obtain or generate the dataset 420B.

The processor may further transform the ID of the dataset 420A using the transforming scheme for Party A. In an example embodiment, the processor may encrypt (or decrypt, encode, decode, manipulate, compress, decompress, convert, etc.) the ID of the dataset 420A using a key of Party A based on the ECDH algorithm or protocol (represented by the function $D_0(.)$). The processor may further transform the ID of the dataset 420B using the transforming scheme for Party B. In an example embodiment, the processor may encrypt (or decrypt, encode, decode, manipulate, compress, decompress, convert, etc.) the ID of the dataset 420B using a key of Party B based on the ECDH algorithm or protocol (represented by the function $D_1(.)$).

It is to be understood that at block 220, for Party A and/or Party B, a sequence of the transforming of the ID of the dataset and the shuffling of the dataset may be switched or changed, without impacting the purpose of the resultant dataset. For example, the processor may transform the dataset 415A to obtain or generate the dataset 420A for Party A, and then shuffle the dataset 420A. The processor may also transform the dataset 415B to obtain or generate the dataset 420B for Party B, and then shuffle the dataset 420B. Processing may proceed from block 220 to block 230.

At block 230 (Exchange and match), the processor of the respective device may exchange the dataset 420A with the dataset 420B between Party A and Party B. For Party A, the processor may dispatch or send the dataset 420A to Party B, and receive or obtain the dataset 420B from Party B. For Party B, the processor may dispatch or send the dataset 420B to Party A, and receive or obtain the dataset 420A from Party A.

The processor may also search for a match (or an inner join operation, etc.) between the dataset 420A and the received dataset 420B to obtain or generate a first intersection (not shown, see the shaded records or elements in the dataset 425A of FIG. 4B, which is identical to the dataset 420A) for Party A. It is to be understood that the above operation incudes for each identification in the received dataset 420B that matches the identification in the dataset 420A, adding or appending the record (or row) of the dataset 420A that contains the matched identification to the first intersection.

The processor may also search for a match (or an inner join operation, etc.) between the dataset 420B and the received dataset 420A to obtain or generate a second intersection (not shown, see the shaded records or elements in the dataset 425B of FIG. 4B, which is identical to the dataset 420B) for Party B. It is to be understood that the above operation incudes, for each identification in the received dataset 420A that matches the identification in the dataset 420B, adding or appending the record (or row) of the dataset 420B that contains the matched identification to the second intersection.

It is to be understood that for Party A, data (e.g., IDs) in the first intersection are transformed (e.g., encoded, etc.) by Party B (via $D_1(.)$), and thus Party A may not know the real data in the first intersection. For Party B, data in the second intersection are also transformed (e.g., encoded, etc.) by Party A (via $D_0(.)$), and thus Party B may not know the real data in the second intersection. That is, the matching or inner join operation conducted, as described above, is a private matching or inner join operation. The processor performs a private identity matching without revealing the real data in the intersection of datasets of the two parties. Processing may proceed from block 230 to block 240.

At block 240 (Perform oblivious shuffling), the processor may perform an oblivious shuffling algorithm (steps described in details below) e.g., with inputs from Party A and Party B and/or by outputting secret shares to Party A and Party B.

In an example embodiment, the processor may receive or obtain a permutation provided by Party A as a first input, and receive or obtain features or attributes (of a dataset) provided by Party B as a second input. For example, the permutation from Party A may be an arrangement of the sequence of records or elements of a dataset (e.g., the dataset 425A or 420A) so that after the arrangement of the sequence, the records or elements in the first intersection (which are the same as the shaded records or elements in dataset 425A, see also the description of block 230) may be arranged on the top in the arranged/permuted dataset. For example, in view of the shaded records or elements in dataset 425A, the permutation may include an arrangement such as "switching the third record/row and the fourth record/row", "moving the fourth record between the first record and the second record", or the like, so that the records or elements in the first intersection (which are the same as the shaded records or elements in dataset 425A) may be the top or front records or elements in the rearranged dataset.

In an example embodiment, the permutation may also include sorting the top or front records or elements of the first intersection (e.g., in a descending or ascending order) in the rearranged dataset. It is to be understood that since Party A knows position (e.g., row numbers, etc.) of the records or elements of the first intersection, in an example embodiment, instead of providing the permutation, Party A may provide an injective function based on the position and the records or elements of the first intersection, as an input to the "oblivious shuffling" algorithm. The features or attributes from Party B may be the features or attributes (T2 and Value) from the dataset 410B.

In an example embodiment, the processor may shuffle or permute the features or attributes (T2 and Value) from the dataset 410B (i.e., rearrange the sequence or order of the rows of the features or attributes of the dataset 410B) using the permutation from Party A (e.g., including "switching the third record and the fourth record", "moving the fourth record between the first record and the second record", or the like) so that the sequence or order of the rows of the features or attributes of the dataset 410B may be arranged following or based on the permutation input from Party A. It is to be understood that the processor may shuffle or permute the features or attributes (T2 and Value) from the dataset 410B of Party B using the permutation from Party A without leaking any information about either the input permutation or the real contents of the input dataset (or a portion thereof) e.g., to each other, due to oblivious shuffling. That is, Party B may not know how the permutation from Party A (i.e., Party B may not know how the features or attributes of the dataset 410B are permuted), and Party A may not know the real features or attributes of the dataset 410B (before and after the permutation).

In an example embodiment, to achieve the "oblivious" shuffling, after shuffling the features or attributes (T2 and Value) from the dataset 410B of Party B using the permutation from Party A, secret shares are to be generated based on the shuffled features or attributes. For example, the processor may generate a secret share (e.g., a first secret share) as an output to Party A, and generate another secret share (e.g., a second secret share) as an output to Party B. That is, Party A receives or obtains the first secret share but may not know the real content of the final result (and thus may not know the real features or attributes of the dataset 410B). Party B receives or obtains the second secret share but may not know the real content of the final result (and thus may not know the permutation (from Party A) being used in the shuffling).

In an example embodiment, the first secret share and the second secret share may be additive shares. That is, a final result indicating the real data may be generated by adding together the first secret share and the second secret share. Thus, an additively homomorphic encryption algorithm or the like may be used to generate the first secret share and/or the second secret share. It is to be understood that the first secret share and the second secret share may be generated using any suitable secret sharing algorithms.

For example, after shuffling the features or attributes (T2 and Value) from the dataset 410B of Party B using the permutation from Party A, for each element (i.e., each attribute or feature) in the shuffled dataset, the processor may generate a corresponding mask, and mask the element (i.e., the attribute or feature) with its corresponding mask using a masking scheme. In an example embodiment, each mask is a random number or random plaintext. For example, as shown in FIG. 4B, the processor may generate a mask ("50_share0") for the T2 data (50) in the dataset 410B, generate a mask ("87 share0") for the Value data (87) in the dataset 410B, etc. The processor may also mask the T2 data (50) in the dataset 410B with its mask ("50_share0") using e.g., an additive or subtractive scheme (e.g., subtracting the mask 50_share0 from the data 50 to get "50-50_share0"), mask the Value data (87) in the dataset 410B with its mask ("87_share0") using e.g., an additive or subtractive scheme (e.g., subtracting the mask 87_share0 from the data 87 to get "87-87_share0"), etc.

In an example embodiment, the processor may output all the masks (e.g., 50_share0, 87_share0, etc.) to Party A as a dataset containing Party A's secret share (of the shuffled features or attributes from the dataset 410B of Party B using the permutation from Party A), and output all the masked data (50-50_share0, 87-87_share0, etc.) to Party B as a dataset containing Party B's secret share (of the shuffled features or attributes from the dataset 410B of Party B using the permutation from Party A). It is to be understood that assuming the size (i.e., the number of records/rows, etc.) of the first or second intersection is N, both Party A and Party B may take the first N records/rows of its corresponding dataset. For example, as shown in FIG. 4B, the size of the first intersection is 3 (see the shaded records in dataset 425A), Party A may take the first 3 records/rows of its corresponding dataset (from the processor) to generate the dataset 435A. It is to be understood that since Party A provides the permutation as the input (and thus Party A knows about the arrangement of the ID field as well), the dataset 435A may include the ID field of the first intersection. Party B may take the first 3 records/rows of its corresponding dataset (from the processor) to generate the dataset 430B.

In another example embodiment, assuming the size (i.e., the number of records/rows, etc.) of the first or second intersection is N, the processor may output the first N rows of the masks (e.g., 50_share0, 87_share0, etc.) to Party A as a dataset containing Party A's secret share (of the shuffled features or attributes from the dataset 410B of Party B using the permutation from Party A), and output the first N rows of the masked data (50-50_share0, 87-87_share0, etc.) to Party B as a dataset containing Party B's secret share (of the shuffled features or attributes from the dataset 410B of Party B using the permutation from Party A). In such embodiment, instead of providing the permutation as the input, Party A may provide an injective function based on the first intersection, as an input to the "oblivious shuffling" algorithm, so that less data may be transferred or used in the oblivious shuffling algorithm.

It is to be understood that in dataset 435A, all the values of T2 and Value fields are masks (random number or random plaintext, e.g., 50_share0, 87_share0, etc.), Party A may not know the real value of the contents of T2 and Value fields. Similarly, in dataset 430B, all the values of T2 and Value fields are data (feature or attribute) masked by masks (and thus the values are also random number or random plaintext, e.g., 50-50_share0, 87-87_share0, etc.), Party B may not know the real value of the contents of T2 and Value fields. That is, Party B may not know how the permutation from Party A (i.e., Party B may not know how the features or attributes of the dataset 410B are permuted), Party A may not know the features or attributes of the dataset 410B (before and after the permutation), and thus the shuffling of the features or attributes (T2 and Value) from the dataset 410B of Party B using the permutation from Party A is "oblivious" shuffling when the outputs or results of the algorithm are secret shares.

It is also to be understood that in dataset 435A, the ID fields are transformed (e.g., encrypted, etc.) e.g., using a key from Party A and a key from Party B (e.g., $D_0(D_1(5))$), which may be the same as $D_1(D_0(5))$ based on e.g., ECDH, etc.), neither Party A nor Party B may know the real value of the ID ("5"). That is, the dataset 435A contains secret share(s) for Party A, and the dataset 430B contains secret share(s) for Party B.

Similarly, the processor may receive or obtain a permutation provided by Party B as a first input, and receive or obtain features or attributes (of a dataset) provided by Party A as a second input. For example, the permutation from Party B may be an arrangement of the sequence of records or elements of a dataset (e.g., the dataset 425B or 420B) so that the after the arrangement of the sequence, the records or elements in the second intersection (which are the same as the shaded records or elements in dataset 425B, see also the description of block 230) may be arranged on the top in the arranged/permuted dataset. For example, in view of the shaded records or elements in dataset 425B, the permutation may include arrangement such as "switching the third record/row and the fourth record/row", "moving the fourth record before the first record", or the like, so that the records or elements in the second intersection (which are the same as the shaded records or elements in dataset 425B) may be the top or front records or elements in the rearranged dataset. In an example embodiment, the permutation may also include sorting the records or elements of the second intersection (e.g., in a descending or ascending order) in the rearranged dataset. The features or attributes from Party A may be the features or attributes (T1) from the dataset 410A.

Similarly, the processor may generate a dataset containing secret shares for Party A and a dataset containing secret shares for Party B using the "oblivious shuffling" algorithm described above. It is to be understood that assuming the size (i.e., the number of records/rows, etc.) of the second intersection is N, both Party A and Party B may take the first N records/rows of its corresponding dataset, to generate the dataset 430A for Party A, and the dataset 435B for Party B. That is, in an example embodiment, the oblivious shuffling processes at Party A and the oblivious shuffling processes at Party B may be symmetric.

It is to be understood that in the processing flow 200, the features or attributes of the datasets (e.g., 405A and/or 450B) are not transformed (e.g., encrypted, etc.), exchanged with the other party, and/or transferred to generate the intersections (e.g., up to the process of block 230, until the process of block 240), and thus the communication complexity and the computational complexity may be significantly reduced compared with existing algorithms.

Figure 3:
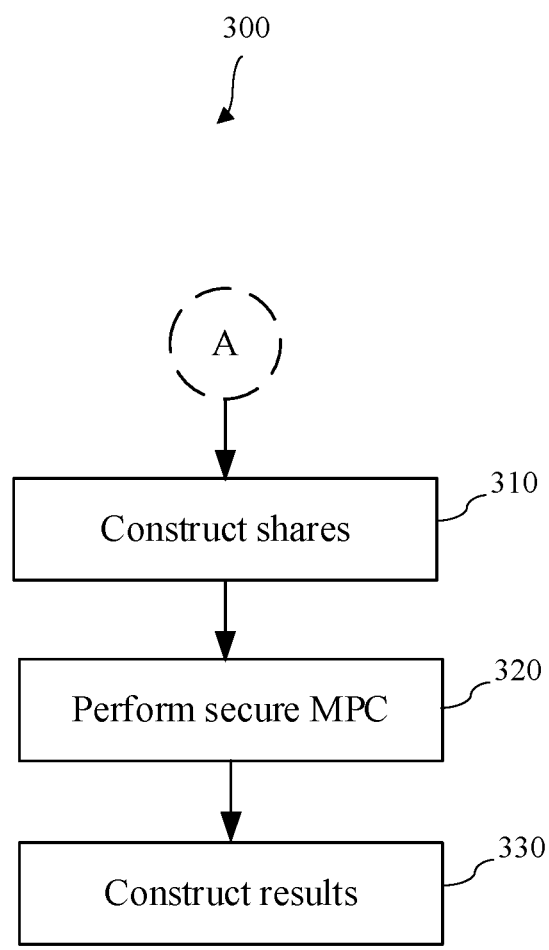
FIG. 3 is a flow chart illustrating an example secret sharing processing flow for private and secure computation and communication, in accordance with at least some embodiments described herein.
Figure 4C:
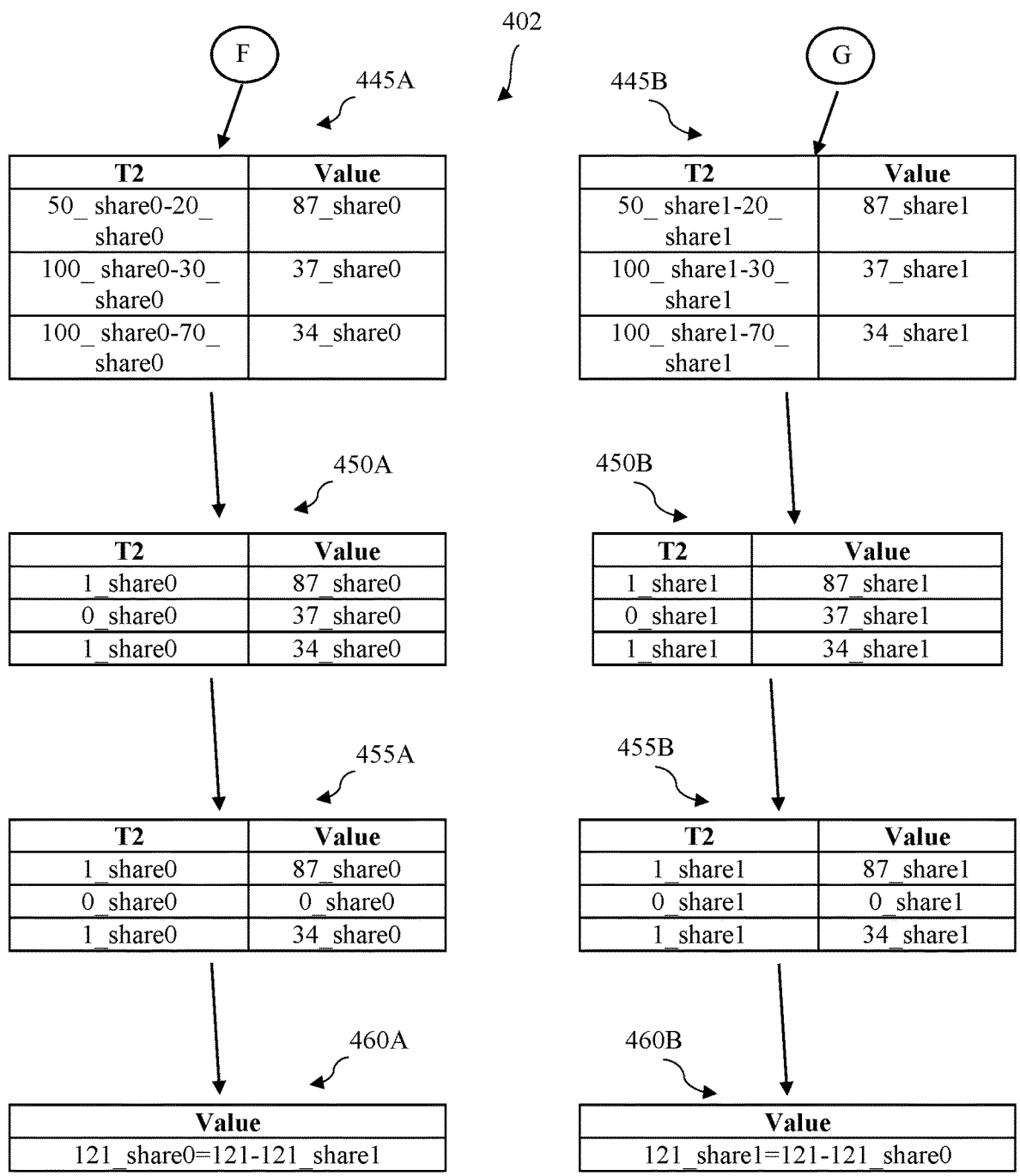
FIG. 4C shows a third portion of a schematic diagram illustrating an example of the processing flow of FIG. 3, in accordance with at least some embodiments described herein.

FIG. 3 is a flow chart illustrating an example secret sharing processing flow 300 for private and secure computation and communication, in accordance with at least some embodiments described herein. FIG. 4C shows a third portion 402 of a schematic diagram illustrating an example of the processing flow 300 of FIG. 3, in accordance with at least some embodiments described herein. It is to be understood that FIG. 4B may also show a portion the schematic diagram illustrating the example of the processing flow 300 of FIG. 3.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 505 of FIG. 5, and/or any other suitable processor), unless otherwise specified.

It is also to be understood that the processing flow 300 can include one or more operations, actions, or functions as illustrated by one or more of blocks 310, 320, and 330. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized from the results at block 240 of FIG. 2. Processing flow 300 may begin at block 310.

At block 310 (Construct shares), the processor may construct the secret shares (dataset 440A) for Party A by combining (e.g., performing a union operation, etc.) the portions of the secret shares (e.g., the dataset 430A and the dataset 435A). The processor may also construct the secret shares (dataset 440B) for Party B by combining (e.g., performing a union operation, etc.) the portions of the secret shares (e.g., the dataset 430B and the dataset 435B). Processing may proceed from block 310 to block 320.

At block 320 (Perform secure MPC), the processor of the respective device may perform a secure multi-party computation (see descriptions below) based on the secret shares of Party A and/or perform secure multi-party computation (see descriptions below) based on the secret shares of Party B.

In an example embodiment, the processor may subtract T1 from T2 for the dataset 440A to obtain or generate the dataset 445A for Party A, and/or subtract T1 from T2 for the dataset 440B to obtain or generate the dataset 445B for Party B.

In an example embodiment, the processor may determine whether T2 is greater than 0 and less than a predetermined value for the dataset 445A to obtain or generate the dataset 450A for Party A. If T2 is greater than 0 and less than a predetermined value, the processor may set the T2 value in the dataset 450A to the secret share of 1 (to represent "True"), which is a random number for Party A. If T2 is not greater than 0 or not less than the predetermined value, the processor may set the T2 value in the dataset 450A to the secret share of 0 (to represent "False"), which is a random number for Party A.

In an example embodiment, the processor may determine whether T2 is greater than 0 and less than a predetermined value for the dataset 445B to obtain or generate the dataset 450B for Party B. If T2 is greater than 0 and less than a predetermined value, the processor may set the T2 value in the dataset 450B to the secret share of 1 (to represent "True"), which is a random number for Party B. If T2 is not greater than 0 or not less than the predetermined value, the processor may set the T2 value in the dataset 450B to the secret share of 0 (to represent "False"), which is a random number for Party B.

In an example embodiment, the processor may also multiply the corresponding T2 and Value of the dataset 450A, and store or save the results in the Value field of the dataset 455A, to generate the dataset 455A for Party A. The processor may also multiply the corresponding T2 and Value of the dataset 450B, and store or save the results in the Value field of the dataset 455B, to generate the dataset 455B for Party B. It is to be understood that the secret share of 1 multiplies any value V may result in the same value V. The secret share of 0 multiplies any value V may result in the secret share of 0.

In an example embodiment, the processor may further sum the Value of the dataset 455A, and store or save the results in the Value field of the dataset 460A, to generate the dataset 460A for Party A. The processor may further sum the Value of the dataset 455B, and store or save the results in the Value field of the dataset 460B, to generate the dataset 460B for Party B. It is to be understood that the secret share of 0 adds any value V may result in the same value V.

It is to be understood that Party A now has the dataset 460A (a secret share) indicating the total value of all users who clicked on e.g., a link or the like on Party A's platform and went to Party B's website, within a certain period of time (e.g., within 70 minutes) after the users clicked on e.g., a link or the like on Party A's platform and made valuable interaction. It is also to be understood that Party A does not know the data in the dataset 460A because the secret share is a random value.

It is to be understood that Party B now has the dataset 460B (a secret share) indicating the total value of all users who clicked on e.g., a link or the like on Party A's platform and went to Party B's website, within a certain period of time (e.g., within 70 minutes) after the users clicked on e.g., a link or the like on Party A's platform and made valuable interaction. It is also to be understood that Party B does not know the data in the dataset 460B because the secret share is a random value. Processing may proceed from block 320 to block 330.

At block 330 (Construct results), the processor of the respective device may exchange the dataset 460A with the dataset 460B between Party A and Party B. For Party A, the processor may dispatch or send the dataset 460A to Party B, and/or receive or obtain the dataset 460B from Party B. The processor may also construct the results ("121") by e.g., adding data in the dataset 460A and data in the received dataset 460B. That is, the total value of all users who clicked on e.g., a link or the like on Party A's platform and went to Party B's website, within a certain period of time (e.g., within 70 minutes) after the users clicked on e.g., a link or the like on Party A's platform and made valuable interaction, is "121".

For Party B, the processor may dispatch or send the dataset 460B to Party A, and/or receive or obtain the dataset 460A from Party A. The processor may also construct the results ("121") by e.g., adding data in the dataset 460B and data in the received dataset 460A. That is, the total value of all users who clicked on e.g., a link or the like on Party A's platform and went to Party B's website, within a certain period of time (e.g., within 70 minutes) after the users clicked on e.g., a link or the like on Party A's platform and made valuable interaction, is "121", which is the same as the result determined by Party A.

It is to be understood that other results may also be constructed or determined by combining the secret shares (440A and 440B), the secret shares (445A and 445B), the secret shares (450A and 450B), the secret shares (455A and 455B), etc. For example, the value in T2 column of datasets 445A and/or 445B may be constructed or determined by combining T2 of the secret shares 445A and 445B, and the constructed or determined results may be used to determine the corresponding T2 values in the datasets 450A and/or 450B. It is also to be understood that other results may further be constructed or determined by conducting other MPC computations on the secret shares to get secret shares of the Party A and Party B, and by combining the secret shares of both Party A and Party B.

FIG. 5 is a schematic structural diagram of an example computer system 500 applicable to implementing an electronic device (for example, the server or one of the terminal devices shown in FIG. 1), arranged in accordance with at least some embodiments described herein. It is to be understood that the computer system shown in FIG. 5 is provided for illustration only instead of limiting the functions and applications of the embodiments described herein.

As depicted, the computer system 500 may include a central processing unit (CPU) 505. The CPU 505 may perform various operations and processing based on programs stored in a read-only memory (ROM) 510 or programs loaded from a storage device 540 to a random-access memory (RAM) 515. The RAM 515 may also store various data and programs required for operations of the system 500. The CPU 505, the ROM 510, and the RAM 515 may be connected to each other via a bus 520. An input/output (I/O) interface 525 may also be connected to the bus 520.

The components connected to the I/O interface 525 may further include an input device 530 including a keyboard, a mouse, a digital pen, a drawing pad, or the like; an output device 535 including a display such as a liquid crystal display (LCD), a speaker, or the like; a storage device 540 including a hard disk or the like; and a communication device 545 including a network interface card such as a LAN card, a modem, or the like. The communication device 545 may perform communication processing via a network such as the Internet, a WAN, a LAN, a LIN, a cloud, etc. In an embodiment, a driver 550 may also be connected to the I/O interface 525. A removable medium 555 such as a magnetic disk, an optical disk, a magneto-optical disk, a semiconductor memory, or the like may be mounted on the driver 550 as desired, such that a computer program read from the removable medium 555 may be installed in the storage device 540.

It is to be understood that the processes described with reference to the flowcharts of FIGS. 2 and 3 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 545, and/or may be installed from the removable medium 555. The computer program, when being executed by the central processing unit (CPU) 505, can implement the above functions specified in the method in the embodiments disclosed herein.

Compared with the existing algorithms, protocols, or systems, testing and/or analysis indicate that with the features in the embodiments disclosed herein, efficiency may be improved, the number of transforming actions or steps (e.g., homomorphic encryptions, decryptions, additions, exchanging, transferring, etc.) may be reduced, and the communication complexity and the computational complexity may be reduced.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for secure computation and communication, the method comprising: transforming identifications of a first dataset using a transforming scheme; dispatching the transformed identifications of the first dataset; receiving identifications of a second dataset; transforming the identifications of the second dataset; dispatching the transformed identifications of the second dataset; receiving a set of identifications; generating a first intersection of the received set of identifications and the transformed identifications of second dataset; determining a first permutation based on the first intersection; performing a first oblivious shuffling based on the first permutation and a set of attributions to generate a first share, a size of the first share being the same as a size of the first intersection; receiving a second share; and constructing a first result based on the first share and the second share.

Aspect 2. The method of aspect 1, further comprising: before dispatching the transformed identifications of first dataset, shuffling the first dataset; and before dispatching the transformed identifications of the second dataset, shuffling the second dataset.

Aspect 3. The method of aspect 1 or aspect 2, further comprising: before constructing the first result, manipulating the first share.

Aspect 4. The method of any one of aspects 1-3, wherein the performing of the first oblivious shuffling based on the first permutation and the set of attributions to generate the first share includes: generating a first portion of the first share based on the first permutation and the set of attributions; generating a second portion of the first share; and generating the first share based on the first portion of the first share and the second portion of the first share.

Aspect 5. The method of aspect 4, further comprising: performing a second oblivious shuffling based on a second permutation and attributions of the first dataset to generate the second portion of the first share.

Aspect 6. The method of any one of aspects 1-5, further comprising: determining a random exponent for the transforming scheme.

Aspect 7. The method of aspect 6, wherein the transforming of the identifications of the first dataset using the transforming scheme includes: mapping the identifications of the first dataset to an elliptic curve, and applying exponentiation on the mapped identifications using the random exponent.

Aspect 8. A method for secure computation and communication, the method comprising: transforming identifications of a first dataset using a transforming scheme; dispatching the transformed identifications of the first dataset; receiving identifications of a second dataset; transforming the identifications of the second dataset; dispatching the transformed identifications of the second dataset; receiving a set of identifications; generating a first intersection of the received set of identifications and the transformed identifications of second dataset; performing a first oblivious shuffling based on a first permutation and attributions of the first dataset to generate a first share, a size of the first share being the same as a size of the first intersection; receiving a second share; and constructing a first result based on the first share and the second share.

Aspect 9. The method of aspect 8, further comprising: before dispatching the transformed identifications of first dataset, shuffling the first dataset; and before dispatching the transformed identifications of the second dataset, shuffling the second dataset.

Aspect 10. The method of aspect 8 or aspect 9, further comprising: before constructing the first result, manipulating the first share.

Aspect 11. The method of any one of aspects 8-10, wherein the performing of the first oblivious shuffling based on the first permutation and the attributions of the first dataset to generate the first share includes: generating a first portion of the first share based on the first permutation and the attributions of the first dataset; generating a second portion of the first share; and generating the first share based on the first portion of the first share and the second portion of the first share.

Aspect 12. The method of aspect 11, further comprising: determining a second permutation based on the first intersection; performing a second oblivious shuffling based on the second permutation and a set of attributions to generate the second portion of the first share.

Aspect 13. The method of any one of aspects 8-12, further comprising: determining a random exponent for the transforming scheme.

Aspect 14. The method of aspect 13, wherein the transforming of the identifications of the first dataset using the transforming scheme includes: mapping the identifications of the first dataset to an elliptic curve, and applying exponentiation on the mapped identifications using the random exponent.

Aspect 15. A non-transitory computer-readable medium having computer-executable instructions stored thereon that, upon execution, cause one or more processors to perform operations comprising: transforming identifications of a first dataset using a transforming scheme; dispatching the transformed identifications of the first dataset; receiving identifications of a second dataset; transforming the identifications of the second dataset; dispatching the transformed identifications of the second dataset; receiving a set of identifications; generating a first intersection of the received set of identifications and the transformed identifications of second dataset; determining a first permutation based on the first intersection; performing a first oblivious shuffling based on the first permutation and a set of attributions to generate a first share, a size of the first share being the same as a size of the first intersection; receiving a second share; and constructing a first result based on the first share and the second share.

Aspect 16. The computer-readable medium of aspect 15, wherein the operations further comprise: before dispatching the transformed identifications of first dataset, shuffling the first dataset; and before dispatching the transformed identifications of the second dataset, shuffling the second dataset.

Aspect 17. The computer-readable medium of aspect 15 or aspect 16, wherein the operations further comprise: before constructing the first result, manipulating the first share.

Aspect 18. The computer-readable medium of any one of aspects 15-17, wherein the performing of the first oblivious shuffling based on the first permutation and the set of attributions to generate the first share includes: generating a first portion of the first share based on the first permutation and the set of attributions; generating a second portion of the first share; and generating the first share based on the first portion of the first share and the second portion of the first share.

Aspect 19. The computer-readable medium of aspect 18, wherein the operations further comprise: performing a second oblivious shuffling based on a second permutation and attributions of the first dataset to generate the second portion of the first share.

Aspect 20. The computer-readable medium of any one of aspects 15-19, wherein the operations further comprise determining a random exponent for the transforming scheme, wherein the transforming of the identifications of the first dataset using the transforming scheme includes: mapping the identifications of the first dataset to an elliptic curve, and applying exponentiation on the mapped identifications using the random exponent.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for secure computation and communication, the method comprising:
   transforming identifications of a first dataset using a transforming scheme, the transforming including encoding or encrypting;
   dispatching the transformed identifications of the first dataset;
   receiving identifications of a second dataset;
   transforming the identifications of the second dataset;
   dispatching the transformed identifications of the second dataset;
   receiving a set of transformed identifications;
   generating a first intersection of the received set of transformed identifications and the transformed identifications of second dataset;
   determining a first permutation based on the first intersection;
   performing a first oblivious shuffling based on the first permutation from one party and a set of attributions from another party to generate a first share, and configuring a size of the first share to be the same as a size of the first intersection;
   receiving a second share; and
   constructing a first result based on the first share and the second share.

2. The method of claim 1, further comprising:
   before dispatching the transformed identifications of first dataset, shuffling the first dataset; and
   before dispatching the transformed identifications of the second dataset, shuffling the second dataset.

3. The method of claim 1, further comprising:
   before constructing the first result, manipulating the first share.

4. The method of claim 1, wherein the performing of the first oblivious shuffling based on the first permutation and the set of attributions to generate the first share includes:
   generating a first portion of the first share based on the first permutation and the set of attributions;
   generating a second portion of the first share; and
   generating the first share based on the first portion of the first share and the second portion of the first share.

5. The method of claim 4, further comprising:
   performing a second oblivious shuffling based on a second permutation and attributions of the first dataset to generate the second portion of the first share.

6. The method of claim 1, further comprising:
   determining a random exponent for the transforming scheme.

7. The method of claim 6, wherein the transforming of the identifications of the first dataset using the transforming scheme includes:
   mapping the identifications of the first dataset to an elliptic curve, and
   applying exponentiation on the mapped identifications using the random exponent.

8. A method for secure computation and communication, the method comprising:
   transforming identifications of a first dataset using a transforming scheme, the transforming including encoding or encrypting;
   dispatching the transformed identifications of the first dataset;
   receiving identifications of a second dataset;
   transforming the identifications of the second dataset;
   dispatching the transformed identifications of the second dataset;
   receiving a set of transformed identifications;
   generating a first intersection of the received set of transformed identifications and the transformed identifications of second dataset;
   performing a first oblivious shuffling based on a first permutation from one party and attributions of the first dataset from another party to generate a first share, and configuring a size of the first share to be the same as a size of the first intersection;
   receiving a second share; and
   constructing a first result based on the first share and the second share.

9. The method of claim 8, further comprising:
   before dispatching the transformed identifications of first dataset, shuffling the first dataset; and
   before dispatching the transformed identifications of the second dataset, shuffling the second dataset.

10. The method of claim 8, further comprising:
before constructing the first result, manipulating the first share.

11. The method of claim 8, wherein the performing of the first oblivious shuffling based on the first permutation and the attributions of the first dataset to generate the first share includes:
generating a first portion of the first share based on the first permutation and the attributions of the first dataset;
generating a second portion of the first share; and
generating the first share based on the first portion of the first share and the second portion of the first share.

12. The method of claim 11, further comprising:
determining a second permutation based on the first intersection;
performing a second oblivious shuffling based on the second permutation and a set of attributions to generate the second portion of the first share.

13. The method of claim 8, further comprising:
determining a random exponent for the transforming scheme.

14. The method of claim 13, wherein the transforming of the identifications of the first dataset using the transforming scheme includes:
mapping the identifications of the first dataset to an elliptic curve, and
applying exponentiation on the mapped identifications using the random exponent.

15. A non-transitory computer-readable medium having computer-executable instructions stored thereon that, upon execution, cause one or more processors to perform operations comprising:
transforming identifications of a first dataset using a transforming scheme, the transforming including encoding or encrypting;
dispatching the transformed identifications of the first dataset;
receiving identifications of a second dataset;
transforming the identifications of the second dataset;
dispatching the transformed identifications of the second dataset;
receiving a set of transformed identifications;
generating a first intersection of the received set of transformed identifications and the transformed identifications of second dataset;
determining a first permutation based on the first intersection;
performing a first oblivious shuffling based on the first permutation from one party and a set of attributions from another party to generate a first share, and configuring a size of the first share to be the same as a size of the first intersection;
receiving a second share; and
constructing a first result based on the first share and the second share.

16. The non-transitory computer-readable medium of claim 15, wherein the operations further comprise:
before dispatching the transformed identifications of first dataset, shuffling the first dataset; and
before dispatching the transformed identifications of the second dataset, shuffling the second dataset.

17. The non-transitory computer-readable medium of claim 15, wherein the operations further comprise:
before constructing the first result, manipulating the first share.

18. The non-transitory computer-readable medium of claim 15, wherein the performing of the first oblivious shuffling based on the first permutation and the set of attributions to generate the first share includes:
generating a first portion of the first share based on the first permutation and the set of attributions;
generating a second portion of the first share; and
generating the first share based on the first portion of the first share and the second portion of the first share.

19. The non-transitory computer-readable medium of claim 18, wherein the operations further comprise:
performing a second oblivious shuffling based on a second permutation and attributions of the first dataset to generate the second portion of the first share.

20. The non-transitory computer-readable medium of claim 15, wherein the operations further comprise determining a random exponent for the transforming scheme,
wherein the transforming of the identifications of the first dataset using the transforming scheme includes:
mapping the identifications of the first dataset to an elliptic curve, and
applying exponentiation on the mapped identifications using the random exponent.

* * * * *